United States Patent
Tu et al.

(10) Patent No.: US 10,909,315 B2
(45) Date of Patent: Feb. 2, 2021

(54) SYNTAX ANALYSIS METHOD AND APPARATUS

(71) Applicant: HUAWEI TECHNOLOGIES CO., LTD., Shenzhen (CN)

(72) Inventors: Zhaopeng Tu, Shenzhen (CN); Xiao Chen, Hong Kong (CN); Wenbin Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 15/872,993

(22) Filed: Jan. 17, 2018

(65) Prior Publication Data

US 2018/0157634 A1 Jun. 7, 2018

Related U.S. Application Data

(63) Continuation of application No. PCT/CN2016/072422, filed on Jan. 28, 2016.

(30) Foreign Application Priority Data

Jul. 22, 2015 (CN) .......................... 2015 1 0435938

(51) Int. Cl.
*G06F 40/211* (2020.01)
*G06F 40/45* (2020.01)
*G06F 40/47* (2020.01)

(52) U.S. Cl.
CPC ............ *G06F 40/211* (2020.01); *G06F 40/45* (2020.01); *G06F 40/47* (2020.01)

(58) Field of Classification Search
CPC ...................................................... G06F 40/45
(Continued)

(56) References Cited

U.S. PATENT DOCUMENTS 6,947,885 B2 * 9/2005 Bangalore ............. G06F 40/211
704/1
8,150,677 B2 4/2012 Menezes et al.
(Continued)

FOREIGN PATENT DOCUMENTS

| CN | 1172993 A | 2/1998 |
| CN | 1311881 A | 9/2001 |

(Continued)

OTHER PUBLICATIONS

Franz Josef Och et al., A Systematic Comparison of Various Statistical Alignment Models, 2003, pp. 19-51. (Year: 2003).*
(Continued)

*Primary Examiner* — Bhavesh M Mehta
*Assistant Examiner* — Timothy Nguyen
(74) *Attorney, Agent, or Firm* — Kilpatrick Townsend & Stockton LLP

(57) ABSTRACT

A syntax analysis method and apparatus are disclosed. The method includes: obtaining a source language sentence that is a translation of a target language sentence (S110); determining instances of state transition for the target language sentence according to the source language sentence and a correspondence between words of the target language sentence and words of the source language sentence (S120); and generating a syntax tree of the target language sentence according to the instances of state transition for the target language sentence (S130). The syntax analysis method and apparatus can improve efficiency of syntax analysis.

16 Claims, 4 Drawing Sheets

(58) Field of Classification Search
USPC .......................................................... 704/2
See application file for complete search history.

(56) References Cited

U.S. PATENT DOCUMENTS

| | | | | |
|---|---|---|---|---|
| 8,214,196 | B2* | 7/2012 | Yamada | G06F 40/44 704/2 |
| 2003/0023423 | A1* | 1/2003 | Yamada | G06F 40/44 704/2 |
| 2005/0171757 | A1* | 8/2005 | Appleby | G06F 40/45 704/2 |
| 2005/0228640 | A1* | 10/2005 | Aue | G06F 40/44 704/9 |
| 2006/0004560 | A1* | 1/2006 | Whitelock | G06F 40/45 704/2 |
| 2006/0111891 | A1* | 5/2006 | Menezes | G06F 40/44 704/3 |
| 2006/0129381 | A1 | 6/2006 | Wakita | |
| 2006/0190241 | A1* | 8/2006 | Goutte | G06F 40/45 704/2 |
| 2008/0071521 | A1* | 3/2008 | Larvet | G06F 40/30 704/9 |
| 2008/0300857 | A1* | 12/2008 | Barbaiani | G06F 40/45 704/4 |
| 2008/0319736 | A1* | 12/2008 | Toutanova | G06F 40/44 704/9 |
| 2009/0106015 | A1 | 4/2009 | Li et al. | |
| 2009/0112573 | A1* | 4/2009 | He | G06F 40/45 704/4 |
| 2009/0299729 | A1* | 12/2009 | Quirk | G06F 40/45 704/9 |
| 2009/0326911 | A1* | 12/2009 | Menezes | G06F 40/55 704/2 |

FOREIGN PATENT DOCUMENTS

| | | |
|---|---|---|
| CN | 102214166 A | 10/2011 |
| CN | 102708098 A | 10/2012 |
| CN | 102760121 A | 10/2012 |
| CN | 102789451 A | 11/2012 |
| CN | 103116578 A | 5/2013 |
| CN | 104239290 A | 12/2014 |
| CN | 104281564 A | 1/2015 |

OTHER PUBLICATIONS

Yoshimasa Tsuruoka, et al., "Chunk parsing revisited, Proceedings of the Ninth International Workshop on Parsing Technologies (IWPT)",Oct. 2005, pp. 133-140.

Muhua Zhu et al., "Fast and Accurate Shift-Reduce Constituent Parsing", Proceedings of the 51st Annual Meeting of the Association for Computational Linguistics, Aug. 4-9, 2013, pp. 434-443.

Liang Huang et al., "Dynamic Programming for Linear-Time Incremental Parsing", Proceedings of the 48th Annual Meeting of the Association for Computational Linguistics, Jul. 11-16, 2010. pp. 1077-1086.

Yue Zhang et al., "A Tale of Two Parsers: investigating and combining graph-based and transition-based dependency parsing using beam-search", Proceedings of the 2008 Conference on Empirical Methods in Natural Language Processing, Oct. 2008. pp. 562-571.

Rens Bod, "An All-Subtrees Approach to Unsupervised Parsing", Proceedings of the 21st International Conference on Computational Linguistics and 44th Annual Meeting of the ACL, Jul. 2006. pp. 865-872.

Shay B. Cohen, et al., "Logistic Normal Priors for Unsupervised Probabilistic Grammar Induction", NIPS 2008.total 8 pages.

Noah A. Smith et al., "Guiding Unsupervised Grammar Induction Using Contrastive Estimation", IJCAI Workshop on Grammatical Inference Applications, 2005.total 10 pages.

Dan Klein, et al., "Corpus-Based Induction of Syntactic Structure:Models of Dependency and Constituency", ACL, 2004. total 8 pages.

Franz Josef Och et al., "A Systematic Comparison of Various Statistical Alignment Models", Computational Linguistics, vol. 29, No. 1, 2003. pp. 19-51.

Yang Liu et al., "Weighted Alignment Matrices for Statistical Machine Translation", Proceedings of the 2009 Conference on Empirical Methods in Natural Language Processing, Aug. 6-7, 2009. pp. 1017-1026.

Ryan McDonald et al., "Universal dependency annotation for multilingual parsing", Proceedings of the 51st Annual Meeting of the Association for Computational Linguistics,Aug. 4-9, 2013. pp. 92-97.

Ryan McDonald et al., "Multi-Source Transfer of Delexicalized Dependency Parsers", Proceedings of the 2011 Conference on Empirical Methods in Natural Language Processing, Jul. 27-31, 2011. pp. 62-72.

Dipanjan Das et al., "Unsupervised part-of-speech tagging with bilingual graph-based projections", Proceedings of the 49th Annual Meeting of the Association for Computational Linguistics, Jun. 19-24, 2011. pp. 600-609.

* cited by examiner $y_l$ learn          $y_r$ English     grammar $\vdots$              $\vdots$          $\vdots$ $x_l$ learn          $x_r$ English grammar

SYNTAX ANALYSIS METHOD AND APPARATUS

CROSS-REFERENCE TO THE RELATED APPLICATION

This application is a continuation of International Application No. PCT/CN2016/072422, filed on Jan. 28, 2016, which claims priority to Chinese Patent Application No. 201510435938.0, filed on Jul. 22, 2015. The disclosures of the aforementioned applications are hereby incorporated by reference in their entireties.

TECHNICAL FIELD

The present disclosure relates to the field of information technologies, and in particular, to a syntax analysis method and apparatus.

BACKGROUND

As fast development of the Internet is accompanied with explosive increase of web text data and development of economic globalization, information is exchanged and interchanged between different countries more frequently. In addition, the booming Internet provides great convenience for obtaining information in various language forms such as English, Chinese, French, German, and Japanese. These language services include information retrieval, text summarization, machine translation, automatic question answering, and the like. In multitudinous language services, syntax analysis can greatly improve performance of the language services. In syntax analysis, a language structure can be analyzed, a sentence structure obtained through syntax analysis can be used to better help a lower-layer application better capture sentence structure information, and semantic information is further understood on this basis. In machine translation, syntax analysis can be used for multiple purposes, for example, can be used to better assist and collect statistics in machine translation and complete long-distance reordering in a translation process from a source language to a target language, or can be used to provide guidance in a process of generating a target translation, so that the translation is more compliant with a syntax structure, and then translation quality is improved.

However, except for few popular languages such as English, Japanese, French, and German, syntax analysis is not developed well for numerous minority languages, for example, languages including Thai, Burmese, Vietnamese, and Cambodian in Southeast Asia. Its bottleneck lies in that syntax resources of these minority languages are severely scarce. Great labor input is required for building syntax resources. In addition, performance of automatic syntax analysis can reach an extent for application only after the syntax resources are built on a particular scale. On the other hand, in an actual process of building the syntax resources artificially, another problem to be faced with is to determine a standard for syntax structures of different languages. Tagging standards need to be unified as far as possible. Due to these difficulties, an automatic syntax analyzer can hardly be built for resource-scarce languages within a short time.

Currently, existing syntax analysis methods may be roughly classified into two types: syntax analysis with supervision and syntax analysis without supervision. Syntax analysis with supervision is to extract features from an artificially tagged syntax treebank, and learn relationships between the features and artificially tagged syntax structures by using a machine learning model; and with respect to a to-be-tagged sentence, search, according to a learned model, for a combination of syntax structures matching features in the sentence, so as to generate a syntax tree of the given sentence. Syntax analysis with supervision requires a machine learning model for learning features and needs to determine an operation on a tagged syntax structure. A large amount of artificially tagged data is required for obtaining cases. Without training data, it is completely impossible to make syntax analysis on a current language. Manual tagging of a syntax treebank needs to consume a lot of labor and time costs, and it is also difficult to ensure consistency of tagging standards. Even if there is training data, if a scale of the training data is too small, over-fitting also easily occurs in case learning, and consequently, performance in actual application is relatively poor.

Syntax analysis without supervision is to automatically generate a syntax treebank having tag information, for a sentence without tag information. A greatest disadvantage of syntax analysis without supervision lies in that a practical syntax analyzer cannot be obtained because unsupervised learning is performed on a raw text only.

SUMMARY

Embodiments of the present disclosure provide a syntax analysis method and apparatus to automatically generate a syntax tree complying with syntax knowledge and improve efficiency of syntax analysis.

According to a first aspect, a syntax analysis method is provided and includes:

obtaining a source language sentence that is a translation of a target language sentence;

determining instances of state transition for the target language sentence according to the source language sentence and a correspondence between words of the target language sentence and words of the source language sentence; and generating a syntax tree of the target language sentence according to the instances of state transition for the target language sentence.

With reference to the first aspect, in a first possible implementation, the determining instances of state transition for the target language sentence according to the source language sentence and a correspondence between words of the target language sentence and words of the source language sentence includes:

obtaining a syntax tree of the source language sentence according to the source language sentence;

for any adjacent segments $x_l$ and $x_r$ of the target language sentence, determining, according to the correspondence, segments $y_l$ and $y_r$ of the source language sentence that correspond to $x_l$ and $x_r$;

if $y_l$ and $y_r$ are components in the syntax tree of the source language sentence, obtaining, according to a relationship between $y_l$ and $y_r$ in the syntax tree of the source language sentence, an instance of state transition corresponding to $x_l$ and $x_r$; and determining the instances of state transition for the target language sentence according to instances of state transition corresponding to all adjacent segments of the target language sentence.

With reference to the first possible implementation of the first aspect, in a second possible implementation, the obtaining, according to a relationship between $y_l$ and $y_r$ in the syntax tree of the source language sentence, an instance of state transition corresponding to $x_l$ and $x_r$ includes:

if $y_l$ and $y_r$ constitute a component in the syntax tree of the source language sentence, obtaining an instance of a merge operation; or if $y_l$ and $y_r$ cannot constitute a component in the syntax tree of the source language sentence, obtaining an instance for a disjoin operation.

With reference to the first or the second possible implementation of the first aspect, in a third possible implementation, the method further includes:

determining a score for the instance of state transition corresponding to $x_l$ and $x_r$; and the determining the instances of state transition for the target language sentence according to instances of state transition corresponding to all adjacent segments of the target language sentence includes:

determining the instances of state transition for the target language sentence according to scores of the instances of state transition corresponding to all the adjacent segments of the target language sentence.

With reference to the third possible implementation of the first aspect, in a fourth possible implementation, the determining the instances of state transition for the target language sentence according to scores of the instances of state transition corresponding to all the adjacent segments of the target language sentence includes:

determining that N−1 instances of state transition with a highest score in the instances of state transition corresponding to all the adjacent segments of the target language sentence are the instances of state transition for the target language sentence, where N is a length of the target language sentence.

With reference to the third or the fourth possible implementation of the first aspect, in a fifth possible implementation, the determining a score for the instance of state transition corresponding to $x_l$ and $x_r$ includes:

determining the score, according to the following equations, for the instance of state transition corresponding to $x_l$ and $x_r$:

$$p(x_l, x_r, y_l, y_r \mid A) = p(x_l, y_l \mid A) \times p(x_r, y_r \mid A), \text{ and}$$

$$p(x, y \mid A) = p(x \mid y, A) \times p(y \mid x, A) = \frac{\sum_{i \in x, j \in y} A(i,j)}{\sum_{i \in x} A(i,j)} \times \frac{\sum_{i \in x, j \in y} A(i,j)}{\sum_{j \in y} A(i,j)},$$

where A is an alignment matrix, and $p(x_l,x_r,y_l,y_r|A)$ indicates a score of an instance of the state transition, where the score is obtained according to $x_l$ and $x_r$, and $y_l$ and $y_r$.

With reference to any one of the first aspect or the foregoing possible implementations of the first aspect, in a sixth possible implementation, the obtaining a source language sentence that is a translation of a target language sentence includes:

obtaining, according to a parallel corpus of a target language and a source language, the source language sentence that is the translation of the target language sentence.

With reference to any one of the first aspect or the foregoing possible implementations of the first aspect, in a seventh possible implementation, the generating a syntax tree of the target language sentence according to the instances of state transition for the target language sentence includes:

generating the syntax tree Y(X) of the target language sentence X according to the following equation:

$$Y(X) = \operatorname*{argmax}_Y \left( \sum_{D, s.t. D(X)=Y} \prod_{T \in D} p(T) \right) \approx \operatorname*{argmax}_Y \left( \max_{D, s.t. D(X)=Y} \prod_{T \in D} p(T) \right),$$

where T indicates a state transition operation, and D indicates derivation of the syntax tree.

With reference to any one of the first aspect or the foregoing possible implementations of the first aspect, in an eighth possible implementation, the method further includes:

training a target language analyzer according to the syntax tree of the target language sentence.

According to a second aspect, a syntax analysis apparatus is provided and includes:

an obtaining module, configured to obtain a source language sentence that is a translation of a target language sentence;

a determining module, configured to determine instances of state transition for the target language sentence according to the source language sentence and a correspondence between words of the target language sentence and words of the source language sentence; and a generation module, configured to generate a syntax tree of the target language sentence according to the instances of state transition for the target language sentence.

With reference to the second aspect, in a first possible implementation, the determining module is further configured to:

obtain a syntax tree of the source language sentence according to the source language sentence;

for any adjacent segments $x_l$ and $x_r$ of the target language sentence, determine, according to the correspondence, segments $y_l$ and $y_r$ of the source language sentence that correspond to $x_l$ and $x_r$;

if $y_l$ and $y_r$ are components in the syntax tree of the source language sentence, obtain, according to a relationship between $y_l$ and $y_r$ in the syntax tree of the source language sentence, an instance of state transition corresponding to $x_l$ and $x_r$; and determine the instances of state transition for the target language sentence according to instances of state transition corresponding to all adjacent segments of the target language sentence.

With reference to the first possible implementation of the second aspect, in a second possible implementation, the determining module is further configured to:

if $y_l$ and $y_r$ constitute a component in the syntax tree of the source language sentence, obtain an instance of a merge operation; or if $y_l$ and $y_r$ cannot constitute a component in the syntax tree of the source language sentence, obtain an instance for a disjoin operation.

With reference to the first or the second possible implementation of the second aspect, in a third possible implementation, the determining module is further configured to:

score the instance of the state transition corresponding to $x_l$ and $x_r$; and determine the instances of state transition for the target language sentence according to scores of the instances of state transition corresponding to all the adjacent segments of the target language sentence.

With reference to the third possible implementation of the second aspect, in a fourth possible implementation, the determining module is further configured to:

determine that N−1 instances of state transition with a highest score in the instances of state transition corresponding to all the adjacent segments of the target language sentence are the instances of state transition for the target language sentence, where N is a length of the target language sentence.

With reference to the third or the fourth possible implementation of the second aspect, in a fifth possible implementation, the determining module is further configured to:

score, according to the following equations, the instance of the state transition corresponding to $x_l$ and $x_r$:

$$p(x_l, x_r, y_l, y_r \mid A) = p(x_l, y_l \mid A) \times p(x_r, y_r \mid A), \text{ and}$$

$$p(x, y \mid A) = p(x \mid y, A) \times p(y \mid x, A) = \frac{\sum_{i \in x, j \in y} A(i, j)}{\sum_{i \in x} A(i, j)} \times \frac{\sum_{i \in x, j \in y} A(i, j)}{\sum_{j \in y} A(i, j)},$$

where A is an alignment matrix, and $p(x_l,x_r,y_l,y_r|A)$ indicates a score of an instance of the state transition, where the score is obtained according to $x_l$ and $x_r$, and $y_l$ and $y_r$.

With reference to any one of the second aspect or the foregoing possible implementations of the second aspect, in a sixth possible implementation, the obtaining module is further configured to:

obtain, according to a parallel corpus of a target language and a source language, the source language sentence that is the translation of the target language sentence.

With reference to any one of the second aspect or the foregoing possible implementations of the second aspect, in a seventh possible implementation, the generation module is further configured to:

generate the syntax tree Y(X) of the target language sentence X according to the following equation:

$$Y(X) = \operatorname*{argmax}_Y \left( \sum_{D, s.t. D(X)=Y} \prod_{T \in D} p(T) \right) \approx \operatorname*{argmax}_Y \left( \max_{D, s.t. D(X)=Y} \prod_{T \in D} p(T) \right),$$

where T indicates a state transition operation, and D indicates derivation of the syntax tree.

With reference to any one of the second aspect or the foregoing possible implementations of the second aspect, in an eighth possible implementation, the apparatus further includes:

a training module, configured to train a target language analyzer according to the syntax tree of the target language sentence.

Based on the foregoing technical solutions, in the embodiments of the present disclosure, a syntax tree of a target language sentence is generated according to a source language sentence from which the target language sentence is translated, and a syntax tree that is of the target language sentence and complies with syntax knowledge may be obtained without manual tagging. Therefore, efficiency of syntax analysis can be improved.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a target language is a language to be analyzed. For example, the target language may be a resource-scarce language. Because syntax resources are scarce, for the resource-scarce language, there is no syntax analyzer or no syntax analyzer with high efficiency.

In the embodiments of the present disclosure, a source language is a language that may undergo syntax analysis by using an existing syntax analyzer or a syntax analysis method. For example, the source language may be a resource-rich language. For the resource-rich language, a syntax analyzer already exists or a syntax analyzer may be obtained by training an existing syntax treebank.

Figure 1:
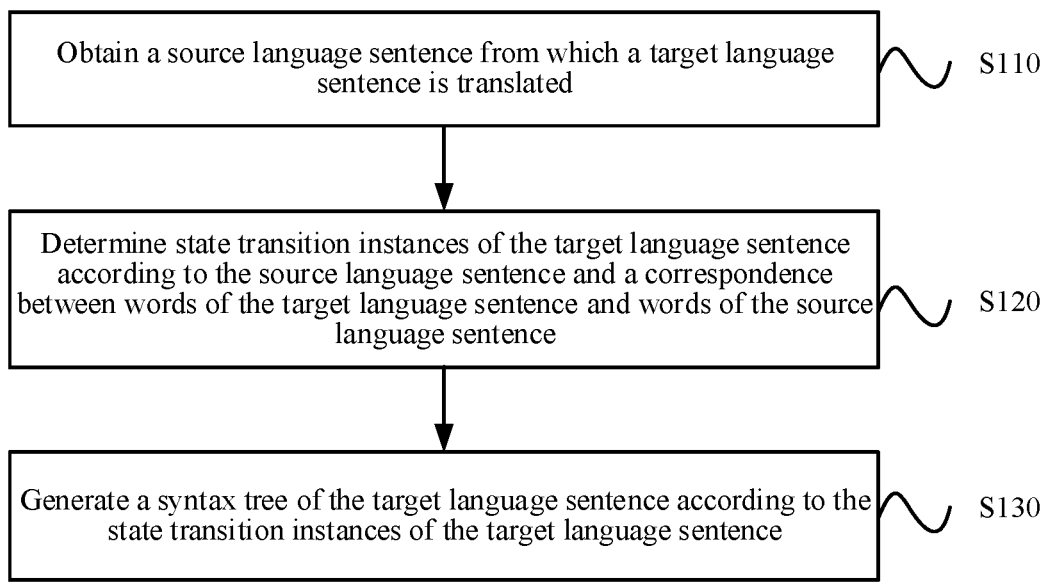
FIG. 1 is a schematic flowchart of a syntax analysis method according to an embodiment of the present invention.

FIG. 1 shows a schematic flowchart of a syntax analysis method 100 according to an embodiment of the present invention. As shown in FIG. 1, the method 100 includes the following steps:

S110. Obtain a source language sentence from which a target language sentence is translated.

S120. Determine instances of state transition for the target language sentence according to the source language sentence and a correspondence between words of the target language sentence and words of the source language sentence.

S130. Generate a syntax tree of the target language sentence according to the instances of state transition for the target language sentence.

In this embodiment of the present invention, a syntax tree of a target language sentence is generated by using a source language sentence from which the target language sentence is translated. For a target language sentence, instances (instance) of state transition (transition) of the target language sentence are first determined according to a source language sentence and a correspondence between words of the target language sentence and words of the source language sentence, and then a syntax tree of the target language sentence is generated according to the instances of state transition for the target language sentence. In this way, a target language syntax treebank may be obtained according to multiple target language sentences. Therefore, in this embodiment of the present invention, the target language syntax treebank can be obtained without manual tagging, and the target language syntax treebank is more compliant with syntax knowledge than a syntax treebank automatically generated in unsupervised learning.

Therefore, in the syntax analysis method according to this embodiment of the present invention, a syntax tree of a target language sentence is generated according to a source language sentence from which the target language sentence is translated, and a syntax tree that is of the target language sentence and complies with syntax knowledge may be obtained without manual tagging. Therefore, efficiency of syntax analysis can be improved.

In an embodiment of the present invention, in some embodiments, the obtaining a source language sentence that is a translation of a target language sentence includes:

obtaining, according to a parallel corpus of a target language and a source language, the source language sentence that is the translation of the target language sentence.

The parallel corpus is a bilingual corpus, and refers to a corpus in which a source language and a target language are mutually translated on a sentence level. That is, for a target language sentence, there is a source language sentence as its translation in the parallel corpus. For example, the parallel corpus may be a bilingual parallel corpus, a bilingual dictionary, or a bilingual correspondence rule. In this embodiment of the present invention, the target language sentence is selected from the parallel corpus, and then the syntax tree of the target language sentence is generated according to the translation (source language sentence) of the target language sentence.

Optionally, a corresponding sentence in the parallel corpus may be preprocessed in a corresponding language. For example, word segmentation needs to be performed for Chinese, and tokenizing (tokenize) needs to be performed for English, so as to reduce data sparsity and increase data consistency.

In an embodiment of the present invention, optionally, the determining instances of state transition for the target language sentence according to the source language sentence and a correspondence between words of the target language sentence and words of the source language sentence includes:

obtaining a syntax tree of the source language sentence according to the source language sentence;

for any adjacent segments $x_l$ and $x_r$ of the target language sentence, determining, according to the correspondence, segments $y_l$ and $y_r$ of the source language sentence that correspond to $x_l$ and $x_r$;

if $y_l$ and $y_r$ are components in the syntax tree of the source language sentence, obtaining, according to a relationship between $y_l$ and $y_r$ in the syntax tree of the source language sentence, an instance of state transition corresponding to $x_l$ and $x_r$; and determining the instances of state transition for the target language sentence according to instances of state transition corresponding to all adjacent segments of the target language sentence.

Specifically, after the source language sentence corresponding to the target language sentence is obtained, the source language sentence is analyzed, and the syntax tree of the source language sentence is obtained. The syntax tree of the source language sentence may be obtained by using an existing source language analyzer, for example, a Stanford parser, or by using an analyzer obtained by training an existing syntax treebank of the source language.

Any adjacent segments $x_l$ and $x_r$ of the target language sentence are enumerated, and are expressed as $<x_l, x_r>$.

Source language segments $y_l$ and $y_r$ corresponding to $<x_l, x_r>$ are obtained according to the correspondence between words of the target language sentence and words of the source language sentence, and are expressed as $<y_l, y_r>$. $y_l$ and $y_r$ are not adjacent definitely. The correspondence may be obtained by using an existing alignment tool, for example, GIZA++, or by using another automatic alignment tool. This is not limited in the present disclosure. For example, a specific alignment form of words is: 1:1 2:3 . . . , indicating that a first word of the source language sentence corresponds to a first word of the target language sentence, and that a second word of the source language sentence corresponds to a third word of the target language sentence.

If the obtained segments $<y_l, y_r>$ of the source language sentence are not components in the syntax tree of the source language sentence, other adjacent segments of the target language sentence are selected. If the obtained segments $<y_l, y_r>$ of the source language sentence are components in the syntax tree of the source language sentence, an instance of a state transition is extracted according to the relationship between $y_l$ and $y_r$. Specifically, if $y_l$ and $y_r$ constitute a component in the syntax tree of the source language sentence, namely, a larger component, an instance of a merge operation is extracted, and this is an example of derivation; or if $y_l$ and $y_r$ cannot constitute a component in the syntax tree of the source language sentence, an instance for a disjoin operation is extracted, and this is a counterexample of derivation.

The foregoing steps are repeated until enumeration is completed. Then an instance of a state transition is selected from all extracted instances of state transition.

In an embodiment of the present invention, optionally, the method 100 further includes:

determining a score for the instance of state transition corresponding to $x_l$ and $x_r$; and in this case, the determining the instances of state transition for the target language sentence according to instances of state transition corresponding to all adjacent segments of the target language sentence includes:

determining the instances of state transition for the target language sentence according to scores of the instances of state transition corresponding to all the adjacent segments of the target language sentence.

Specifically, an error exists in a word correspondence (or referred to as alignment), and especially between heterogeneous languages. Therefore, alignment strength may be high or low for source language segments and target language segments. Optionally, when the source language segments $<x_l, x_r>$ corresponding to $<y_l, y_r>$ are determined, a selection may be made according to one or more best alignment results. During the selection, the instances of state transition may be selected according to the scores of the instances of state transition. Optionally, it may be determined that N−1 instances of state transition with a highest score in the instances of state transition corresponding to all the adjacent segments of the target language sentence are the instances of state transition for the target language sentence, where N is a length of the target language sentence.

In an embodiment of the present invention, optionally, the instance of the state transition corresponding to $x_l$ and $x_r$ may be scored according to the following equations:

$$p(x_l, x_r, y_l, y_r | A) = p(x_l, y_l | A) \times p(x_r, y_r | A) \quad (1)$$

$$p(x, y | A) = p(x | y, A) \times p(y | x, A) = \frac{\sum_{i \in x, j \in y} A(i,j)}{\sum_{i \in x} A(i,j)} \times \frac{\sum_{i \in x, j \in y} A(i,j)}{\sum_{j \in y} A(i,j)} \quad (2)$$

where A is an alignment matrix, $p(x_l,x_r,y_l,y_r|A)$ indicates a score of an instance of the state transition, where the score is obtained according to $x_l$ and $x_r$, and $y_l$ and $y_r$, i is a word in a segment x, and j is a word in a segment y.

It should be understood that, the equations (1) and (2) are only a manner of scoring an instance. An instance may also be scored in another manner in the present disclosure, for example, scored in another alignment manner or by using another alignment matrix. This is not limited in the present disclosure.

The following describes this embodiment of the present invention in detail with reference to specific examples. It should be noted that, these examples are used only to help a person skilled in the art better understand this embodiment of the present invention but are not used to limit the scope of this embodiment of the present invention.

A given target language sentence is "railway workers learn English grammar", and its translation is a source language sentence "铁路工人学习英语语法".

Figure 2:
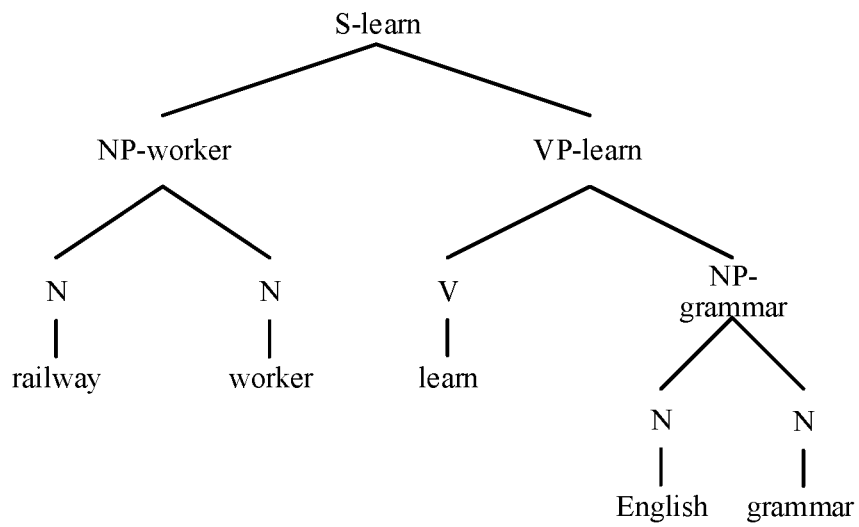
FIG. 2 is a schematic diagram of a syntax tree of a source language sentence according to an embodiment of the present invention.

For the source language sentence, its syntax tree may be obtained according to an existing syntax analyzer, as shown in FIG. 2.

Two adjacent segments of the target language sentence are enumerated. For example, the two adjacent segments <$x_l$, $x_r$> are <learn, English grammar>.

Figures 3, 4:
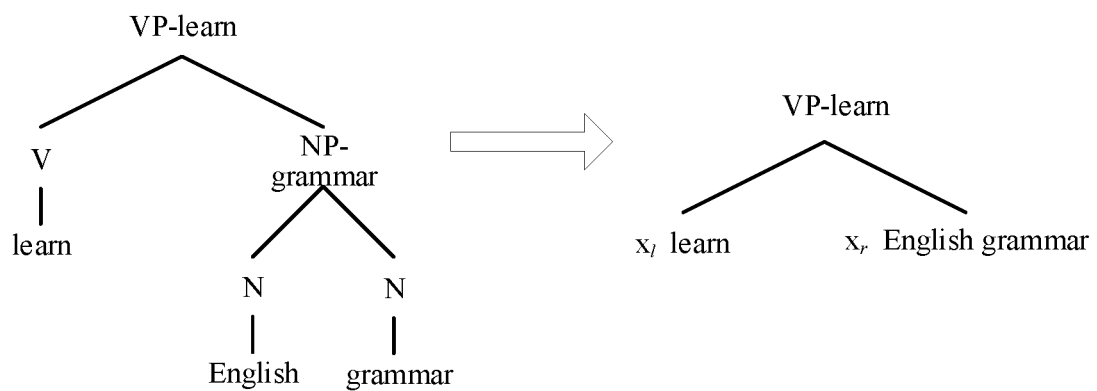
FIG. 3 is a schematic diagram of a segment correspondence according to an embodiment of the present invention.
FIG. 4 is a schematic diagram of an extracted instance according to an embodiment of the present invention.

Segments <$y_l$, $y_r$> of the source language sentence that correspond to the two adjacent segments are obtained according to a correspondence. As shown in FIG. 3, the corresponding segments are <学习, 英语语法>.

Whether <$y_l$, $y_r$> are components in the syntax tree of the source language sentence is determined. As can be obtained from FIG. 2, <学习, 英语语法> are components in the syntax tree of the source language sentence, namely, <V, NP>.

An instance of a state transition is extracted according to a relationship between $y_l$ and $y_r$. As shown in FIG. 4, <V, NP> constitute a larger component VP, that is, <V, NP> may be merged. Therefore, by derivation, it is considered that <learn, English grammar> may also be merged. Therefore, an instance of a merge operation is extracted, and the instance is scored.

The foregoing steps are repeated until all adjacent segments are enumerated, and finally, N−1 instances (N is a length of the target language sentence) with a highest score are selected.

After instances of state transition for the target language sentence are obtained, a syntax tree of the target language sentence is generated according to the instances of state transition for the target language sentence.

In an embodiment of the present invention, optionally, the syntax tree Y(X) of the target language sentence X may be generated according to the following equation:

$$Y(X) = \underset{Y}{\mathrm{argmax}} \left( \sum_{D, s.t. D(X)=Y} \prod_{T \in D} p(T) \right) \approx \underset{Y}{\mathrm{argmax}} \left( \max_{D, s.t. D(X)=Y} \prod_{T \in D} p(T) \right), \quad (3)$$

where T indicates a state transition operation (transition operation), and D indicates derivation (derivation) of the syntax tree.

In the equation (3), the state transition operation T corresponding to the instance may be expressed as T=(λ,α,β), where λ∈{reduce,separate}, indicating whether two components should be merged or disjoined, α∈NT, indicating a target non-terminal (non-terminal) after the merging, and β∈{left,right}, indicating which is a central component after the merging.

The state transition operation (λ,α,β) may be split into two parts:

(λ,α), a component syntax analysis operation; and
(λ,β), a dependency syntax analysis operation.

A score p(T) of the state transition operation T=(λ,α,β) is a product of scores of the two parts:

$$p(T|S,C_c,C_d)=p(\lambda,\alpha,\beta|S,C_c,C_d)=p(\lambda,\alpha|S,C_c) \times p(\lambda,\beta|S,C_d) \quad (4)$$

where S indicates a state, and $C_c$ and $C_d$ indicate a component classifier and a dependency classifier respectively.

For $p(\lambda,\alpha|S,C_c)$ and $p(\lambda,\beta|S,C_d)$, a corresponding feature of each instance may be extracted by using a feature template, and a correlation probability (namely, a score) is obtained by training a classifier.

It should be understood that, the equation (3) is only a manner of generating a syntax tree. In the present disclosure, a variation of the equation (3) or any other score-based manner may also be used to generate a syntax tree. This is not limited in the present disclosure.

Figure 5:
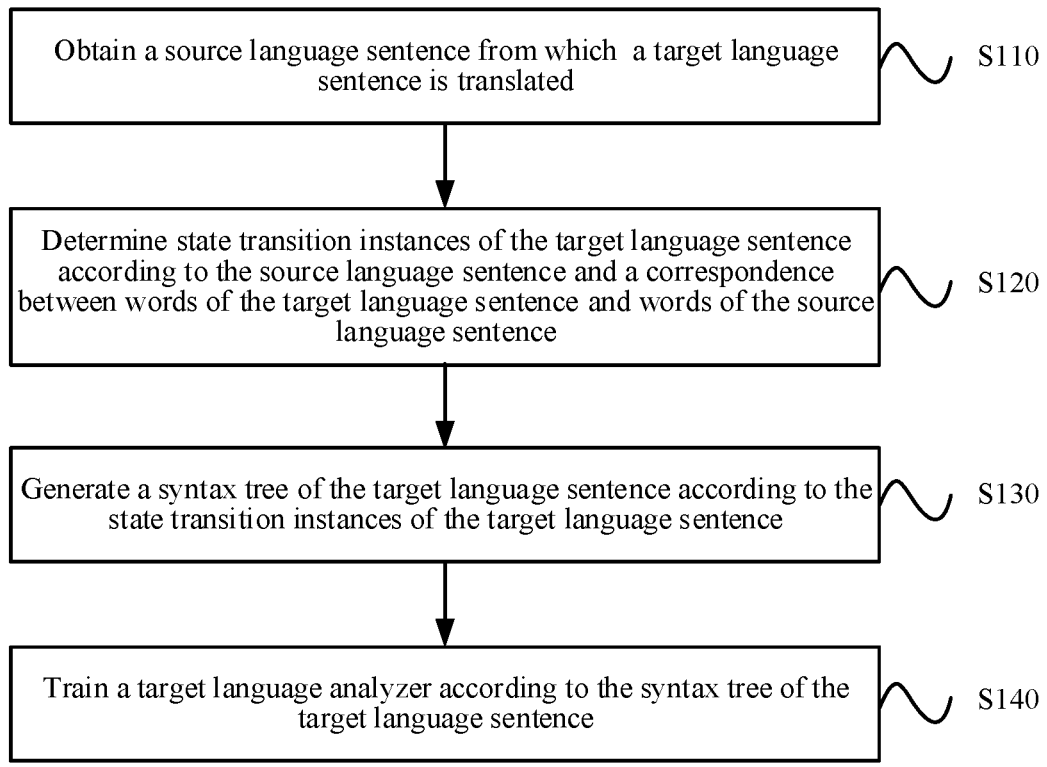
FIG. 5 is a schematic flowchart of a syntax analysis method according to another embodiment of the present invention.

In an embodiment of the present invention, as shown in FIG. 5, optionally, the method 100 further includes the following step:

S140. Train a target language analyzer according to the syntax tree of the target language sentence.

Specifically, the generated syntax tree of the target language sentence may be used to train the target language analyzer. That is, syntax trees of multiple target language sentences may constitute a target language syntax treebank, used to train the target language analyzer. The prior art may be used to train the analyzer according to the syntax treebank. Details are not described herein.

In the syntax analysis method according to this embodiment of the present invention, a syntax tree of a target language sentence is generated according to a source language sentence from which the target language sentence is translated, and a syntax tree that is of the target language sentence and complies with syntax knowledge may be obtained without manual tagging. Therefore, efficiency of syntax analysis can be improved.

It should be understood that, sequence numbers of the foregoing processes do not mean execution sequences in various embodiments of the present disclosure. The execution sequences of the processes should be determined according to functions and internal logic of the processes, and should not constitute any limitation on the implementation processes of the embodiments of the present disclosure.

The foregoing describes a syntax analysis method in detail according to an embodiment of the present invention.

The following describes a syntax analysis apparatus according to an embodiment of the present invention.

Figure 6:
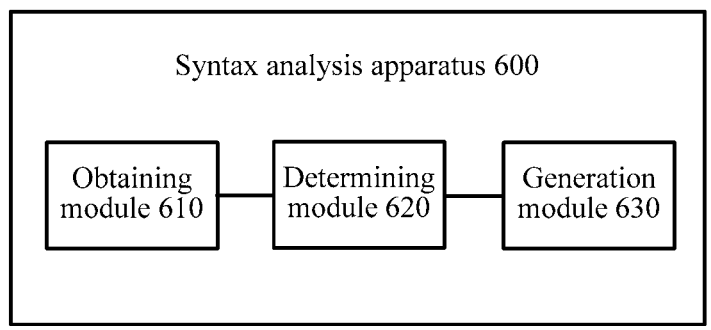
FIG. 6 is a schematic block diagram of a syntax analysis apparatus according to an embodiment of the present invention.

FIG. 6 shows a schematic block diagram of a syntax analysis apparatus 600 according to an embodiment of the present invention. As shown in FIG. 6, the apparatus 600 includes:

an obtaining module 610, configured to obtain a source language sentence from which a a target language sentence is translated;

a determining module 620, configured to determine instances of state transition for the target language sentence according to the source language sentence and a correspondence between words of the target language sentence and words of the source language sentence; and a generation module 630, configured to generate a syntax tree of the target language sentence according to the instances of state transition for the target language sentence.

In this embodiment of the present invention, a syntax tree of a target language sentence is generated by using a source language sentence from which the target language sentence is translated. For a target language sentence, instances of state transition for the target language sentence are first determined according to a source language sentence and a correspondence between words of the target language sentence and words of the source language sentence, and then a syntax tree of the target language sentence is generated according to the instances of state transition for the target language sentence. In this way, a target language syntax treebank may be obtained according to multiple target language sentences. Therefore, in this embodiment of the present invention, the target language syntax treebank can be obtained without manual tagging, and the target language syntax treebank is more compliant with syntax knowledge than a syntax treebank automatically generated in unsupervised learning.

Therefore, in the syntax analysis apparatus according to this embodiment of the present invention, a syntax tree of a target language sentence is generated according to a source language sentence from which the target language sentence is translated, and a syntax tree that is of the target language sentence and complies with syntax knowledge may be obtained without manual tagging. Therefore, efficiency of syntax analysis can be improved.

In an embodiment of the present invention, optionally, the determining module 620 is further configured to:

obtain a syntax tree of the source language sentence according to the source language sentence;

for any adjacent segments $x_l$ and $x_r$ of the target language sentence, determine, according to the correspondence, segments $y_l$ and $y_r$ of the source language sentence that correspond to $x_l$ and $x_r$;

if $y_l$ and $y_r$ are components in the syntax tree of the source language sentence, obtain, according to a relationship between $y_l$ and $y_r$ in the syntax tree of the source language sentence, an instance of state transition corresponding to $x_l$ and $x_r$; and determine the instances of state transition for the target language sentence according to instances of state transition corresponding to all adjacent segments of the target language sentence.

In an embodiment of the present invention, optionally, the determining module 620 is further configured to:

if $y_l$ and $y_r$ constitute a component in the syntax tree of the source language sentence, obtain an instance of a merge operation; or if $y_l$ and $y_r$ cannot constitute a component in the syntax tree of the source language sentence, obtain an instance for a disjoin operation.

In an embodiment of the present invention, optionally, the determining module 620 is further configured to:

score the instance of the state transition corresponding to $x_l$ and $x_r$; and determine the instances of state transition for the target language sentence according to scores of the instances of state transition corresponding to all the adjacent segments of the target language sentence.

In an embodiment of the present invention, optionally, the determining module 620 is further configured to:

determine that N−1 instances of state transition with a highest score in the instances of state transition corresponding to all the adjacent segments of the target language sentence are the instances of state transition for the target language sentence, where N is a length of the target language sentence.

In an embodiment of the present invention, optionally, the determining module 620 is further configured to:

score, according to the following equations, the instance of the state transition corresponding to $x_l$ and $x_r$:

$$p(x_l, x_r, y_l, y_r | A) = p(x_l, y_l | A) \times p(x_r, y_r | A), \text{ and}$$

$$p(x, y | A) = p(x | y, A) \times p(y | x, A) = \frac{\sum_{i \in x, j \in y} A(i, j)}{\sum_{i \in x} A(i, j)} \times \frac{\sum_{i \in x, j \in y} A(i, j)}{\sum_{j \in y} A(i, j)},$$

where A is an alignment matrix, and $p(x_l,x_r,y_l,y_r|A)$ indicates a score of an instance of the state transition, where the score is obtained according to $x_l$ and $x_r$, and $y_l$ and $y_r$.

In an embodiment of the present invention, optionally, the obtaining module 610 is further configured to:

obtain, according to a parallel corpus of a target language and a source language, the source language sentence that is the translation of the target language sentence.

In an embodiment of the present invention, optionally, the generation module 630 is further configured to:

generate the syntax tree Y(X) of the target language sentence X according to the following equation:

$$Y(X) = \operatorname*{argmax}_{Y} \left( \sum_{D, s.t. D(X)=Y} \prod_{T \in D} p(T) \right) \approx \operatorname*{argmax}_{Y} \left( \max_{D, s.t. D(X)=Y} \prod_{T \in D} p(T) \right),$$

where T indicates a state transition operation, and D indicates derivation of the syntax tree.

In an embodiment of the present invention, optionally, the apparatus 600 further includes:

a training module, configured to train a target language analyzer according to the syntax tree of the target language sentence.

The syntax analysis apparatus 600 according to this embodiment of the present invention may correspond to an entity for executing a syntax analysis method according to an embodiment of the present invention, and the foregoing and other operations and/or functions of the modules in the apparatus 600 are separately used to implement the corresponding procedures of the method. Details are not described again herein for brevity.

In the syntax analysis apparatus according to this embodiment of the present invention, a syntax tree of a target language sentence is generated according to a source language sentence from which the target language sentence is translated, and a relatively good syntax tree that is of the target language sentence and complies with syntax knowledge may be obtained without manual tagging. Therefore, efficiency of syntax analysis can be improved.

Figure 7:
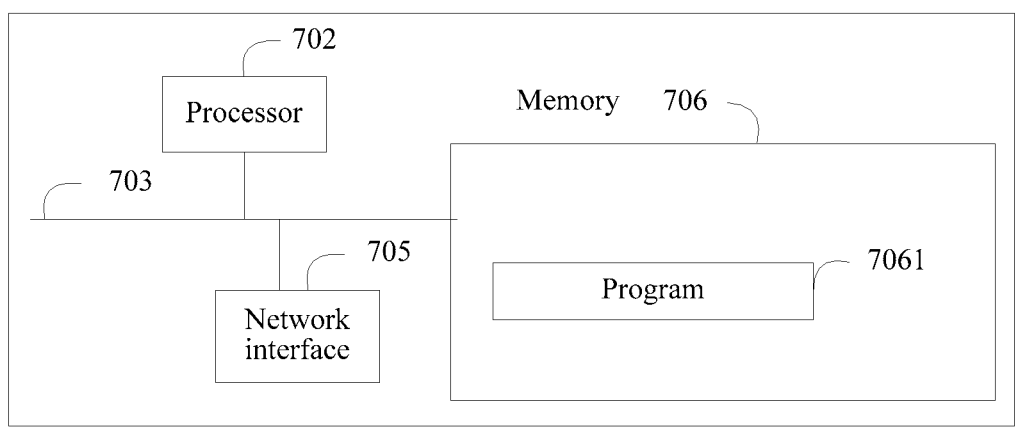
FIG. 7 is a schematic structural diagram of a syntax analysis apparatus according to another embodiment of the present invention.

FIG. 7 shows a structure of a syntax analysis apparatus according to still another embodiment of the present invention. The apparatus includes at least one processor 702 (for example, a CPU), at least one network interface 705 or another communications interface, a memory 706, and at least one communications bus 703 configured to implement connection and communication between the components. The processor 702 is configured to execute an executable module stored in the memory 706, for example, a computer program. The memory 706 may include a high-speed random access memory (RAM, Random Access Memory), and may also further include a non-volatile memory (non-volatile memory), for example, at least one disk storage. By using the at least one network interface 705 (which may be wired or wireless), a communication connection to at least one other network element is implemented.

In some implementations, the memory 706 stores a program 7061, and the processor 702 executes the program 7061 to perform the following operations:

obtaining a source language sentence that is a translation of a target language sentence;

determining instances of state transition for the target language sentence according to the source language sentence and a correspondence between words of the target language sentence and words of the source language sentence; and generating a syntax tree of the target language sentence according to the instances of state transition for the target language sentence.

Optionally, the processor 702 is further configured to:

obtain a syntax tree of the source language sentence according to the source language sentence;

for any adjacent segments $x_l$ and $x_r$ of the target language sentence, determine, according to the correspondence, segments $y_l$ and $y_r$ of the source language sentence that correspond to $x_l$ and $x_r$;

if $y_l$ and $y_r$ are components in the syntax tree of the source language sentence, obtain, according to a relationship between $y_l$ and $y_r$ in the syntax tree of the source language sentence, an instance of state transition corresponding to $x_l$ and $x_r$; and determine the instances of state transition for the target language sentence according to instances of state transition corresponding to all adjacent segments of the target language sentence.

Optionally, the processor 702 is further configured to:

if $y_l$ and $y_r$ constitute a component in the syntax tree of the source language sentence, obtain an instance of a merge operation; or if $y_l$ and $y_r$ cannot constitute a component in the syntax tree of the source language sentence, obtain an instance for a disjoin operation.

Optionally, the processor 702 is further configured to:

score the instance of the state transition corresponding to $x_l$ and $x_r$; and determine the instances of state transition for the target language sentence according to scores of the instances of state transition corresponding to all the adjacent segments of the target language sentence.

Optionally, the processor 702 is further configured to:

determine that N−1 instances of state transition with a highest score in the instances of state transition corresponding to all the adjacent segments of the target language sentence are the instances of state transition for the target language sentence, where N is a length of the target language sentence.

Optionally, the processor 702 is further configured to:

score, according to the following equations, the instance of the state transition corresponding to $x_l$ and $x_r$:

$$p(x_l, x_r, y_l, y_r \mid A) = p(x_l, y_l \mid A) \times p(x_r, y_r \mid A), \text{ and}$$

$$p(x, y \mid A) = p(x \mid y, A) \times p(y \mid x, A) = \frac{\sum_{i \in x, j \in y} A(i, j)}{\sum_{i \in x} A(i, j)} \times \frac{\sum_{i \in x, j \in y} A(i, j)}{\sum_{j \in y} A(i, j)},$$

where A is an alignment matrix, and $p(x_l,x_r,y_l,y_r|A)$ indicates a score of an instance of the state transition, where the score is obtained according to $x_l$ and $x_r$, and $y_l$ and $y_r$.

Optionally, the processor 702 is further configured to:

obtain, according to a parallel corpus of a target language and a source language, the source language sentence that is the translation of the target language sentence.

Optionally, the processor 702 is further configured to:

generate the syntax tree Y(X) of the target language sentence X according to the following equation:

$$Y(X) = \operatorname*{argmax}_{Y}\left(\sum_{D, s.t. D(X)=Y} \prod_{T \in D} p(T)\right) \approx \operatorname*{argmax}_{Y}\left(\max_{D, s.t. D(X)=Y} \prod_{T \in D} p(T)\right),$$

where T indicates a state transition operation, and D indicates derivation of the syntax tree.

Optionally, the processor 702 is further configured to train a target language analyzer according to the syntax tree of the target language sentence.

As can be seen from the foregoing technical solutions provided by the embodiments of the present disclosure, in the embodiments of the present disclosure, a syntax tree of a target language sentence is generated according to a source language sentence from which the target language sentence is translated, and a syntax tree that is of the target language sentence and complies with syntax knowledge may be obtained without manual tagging. Therefore, efficiency of syntax analysis is improved.

It should be understood that, the term "and/or" in this embodiment of the present invention describes only an association relationship for describing associated objects and represents that three relationships may exist. For example, A and/or B may represent the following three cases: A exists (B may or may not exist), both A and B exist, or B exists (A may or may not exist). In addition, the character "/" in this specification generally indicates an "or" relationship between the associated objects.

A person of ordinary skill in the art may be aware that, in combination with the examples described in the embodiments disclosed herein, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided herein, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure.

What is claimed is:

1. A syntax analysis method, comprising:
   obtaining a source language sentence, wherein a target language sentence is translated from the source language;
   determining instances of state transition for the target language sentence according to the source language sentence and a correspondence between words of the target language sentence and words of the source language sentence, the determining comprising obtaining at least some of the instances of state transition for corresponding adjacent target segments $x_l$ and $x_r$ of the target language sentence according to a relationship between source segments $y_l$ and $y_r$ in a syntax tree of the source language sentence and based on determining that the source segments $y_l$ and $y_r$ correspond to the target segments $x_l$ and $x_r$ and are components in the syntax tree of the source language sentence;
   generating a syntax tree of the target language sentence according to the instances of state transition for the target language sentence, wherein the syntax tree of the target language sentence does not include any word in the source language sentence; and
   training a target language analyzer according to the syntax tree of the target language sentence.

2. The method according to claim 1, wherein determining the instances of the state transition for the target language sentence according to the source language sentence and a correspondence between words of the target language sentence and words of the source language sentence comprises:
   obtaining the syntax tree of the source language sentence according to the source language sentence; and
   determining all of the instances of state transition for the target language sentence according to the instances of state transition corresponding to all of the adjacent target segments.

3. The method according to claim 1, wherein obtaining the at least some of the instances of state transition for the corresponding adjacent target segments $x_l$ and $x_r$ comprises:
   if $y_l$ and $y_r$ constitute a component in the syntax tree of the source language sentence, obtaining an instance of a merge operation; or
   if $y_l$ and $y_r$ cannot constitute a component in the syntax tree of the source language sentence, obtaining an instance for a disjoin operation.

4. The method according to claim 1, further comprising:
   determining a score for the instance of state transition corresponding to $x_l$ and $x_r$,
   wherein obtaining the at least some of the instances of state transition for the corresponding adjacent target segments $x_l$ and $x_r$ comprises is further according to scores of the instances of state transition corresponding to all the adjacent target segments.

5. The method according to claim 4, wherein obtaining the at least some of the instances of state transition for the corresponding adjacent target segments $x_l$ and $x_r$ further according to the scores of the instances of state transition corresponding to all the adjacent target segments comprises:
   determining that N−1 instances of state transition with a highest score in the instances of state transition corresponding to all the adjacent target segments are the instances of state transition for the target language sentence, wherein N is a length of the target language sentence.

6. The method according to claim 4, wherein obtaining the at least some of the instances of state transition for the corresponding adjacent target segments $x_l$ and $x_r$ further according to the scores of the instances of state transition corresponding to all the adjacent target segments comprises:
   determining the score, according to the following equations, for the instance of state transition corresponding to $x_l$ and $x_r$:

$$p(x_l, x_r, y_l, y_r \mid A) = p(x_l, y_l \mid A) \times p(x_r, y_r \mid A), \text{ and}$$

$$p(x, y \mid A) = p(x \mid y, A) \times p(y \mid x, A) = \frac{\sum_{i \in x, j \in y} A(i, j)}{\sum_{i \in x} A(i, j)} \times \frac{\sum_{i \in x, j \in y} A(i, j)}{\sum_{j \in y} A(i, j)},$$

wherein A is an alignment matrix, and $p(x_1, x_r, y_l, y_r \mid A)$ indicates a score of an instance of the state transition, wherein the score is obtained according to $x_l$ and $x_r$, and $y_l$ and $y_r$.

7. The method according to claim 1, wherein obtaining the source language sentence comprises:
   obtaining, according to a parallel corpus of a target language and a source language, the source language sentence.

8. The method according to claim 1, wherein generating the syntax tree of the target language sentence according to the instances of state transition for the target language sentence comprises:
   generating the syntax tree Y(X) of the target language sentence X according to the following equation:

$$Y(X) = \underset{Y}{\operatorname{argmax}}\left(\sum_{D, s.t. D(X)=Y} \prod_{T \in D} p(T)\right) \approx \underset{Y}{\operatorname{argmax}}\left(\max_{D, s.t. D(X)=Y} \prod_{T \in D} p(T)\right),$$

wherein T indicates a state transition operation, and D indicates derivation of the syntax tree.

9. A syntax analysis apparatus, comprising:
   an obtaining device in a server, configured to obtain a source language sentence, wherein a target language sentence is translated from the source language;
   a determining device in the server, configured to determine instances of state transition for the target language sentence according to the source language sentence and a correspondence between words of the target language sentence and words of the source language sentence, the determining comprising obtaining at least some of the instances of state transition for corresponding adjacent target segments $x_l$ and $x_r$ of the target language sentence according to a relationship between source segments $y_l$ and $y_r$ in a syntax tree of the source language sentence and based on determining that the source segments $y_l$ and $y_r$ correspond to the target segments $x_l$ and $x_r$ and are components in the syntax tree of the source language sentence;
   a generation device in the server, configured to generate a syntax tree of the target language sentence according to the instances of state transition for the target language sentence, wherein the syntax tree of the target language sentence does not include any word in the source language sentence; and
   a training device, configured to train a target language analyzer according to the syntax tree of the target language sentence.

10. The apparatus according to claim 9, wherein the determining device is further configured to:
   obtain the syntax tree of the source language sentence according to the source language sentence; and
   determine all of the instances of state transition for the target language sentence according to the instances of state transition corresponding to all of the adjacent target segments.

11. The apparatus according to claim 9, wherein the determining device is further configured to obtain the at least some of the instances of state transition for the corresponding adjacent target segments by:
   if $y_l$ and $y_r$ constitute a component in the syntax tree of the source language sentence, obtaining an instance of a merge operation; or
   if $y_l$ and $y_r$ cannot constitute a component in the syntax tree of the source language sentence, obtaining an instance for a disjoin operation.

12. The apparatus according to claim 9, wherein the determining device is further configured to:
   determine a score for the instance of the state transition corresponding to $x_l$ and $x_r$; and
   determine the instances of state transition for the target language sentence according to scores of the instances of state transition corresponding to all the adjacent target segments of the target language sentence.

13. The apparatus according to claim 12, wherein the determining device is further configured to:
   determine that N−1 instances of state transition with a highest score in the instances of state transition corresponding to all the adjacent target segments of the target language sentence are the instances of state transition for the target language sentence, wherein N is a length of the target language sentence.

14. The apparatus according to claim 12, wherein the determining device is further configured to:
   determine a score, according to the following equations, for the instance of the state transition corresponding to $x_l$ and $x_r$:

$$p(x_l, x_r, y_l, y_r \mid A) = p(x_l, y_l \mid A) \times p(x_r, y_r \mid A), \text{ and}$$

$$p(x, y \mid A) = p(x \mid y, A) \times p(y \mid x, A) = \frac{\sum_{i \in x, j \in y} A(i, j)}{\sum_{i \in x} A(i, j)} \times \frac{\sum_{i \in x, j \in y} A(i, j)}{\sum_{j \in y} A(i, j)},$$

wherein A is an alignment matrix, and $p(x_l, x_r, y_l, y_r \mid A)$ indicates a score of an instance of the state transition, wherein the score is obtained according to $x_l$ and $x_r$, and $y_l$ and $y_r$.

15. The apparatus according to claim 9, wherein the obtaining device is further configured to:
   obtain, according to a parallel corpus of a target language and a source language, the source language sentence that is the translation of the target language sentence.

16. The apparatus according to claim 9, wherein the generation device is further configured to:
   generate the syntax tree Y(X) of the target language sentence X according to the following equation:

$$Y(X) = \underset{Y}{\operatorname{argmax}}\left(\sum_{D, s.t. D(X)=Y} \prod_{T \in D} p(T)\right) \approx \underset{Y}{\operatorname{argmax}}\left(\max_{D, s.t. D(X)=Y} \prod_{T \in D} p(T)\right),$$

wherein T indicates a state transition operation, and D indicates derivation of the syntax tree.

* * * * *